(12) United States Patent
Strömstedt et al.

(10) Patent No.: US 8,810,054 B2
(45) Date of Patent: Aug. 19, 2014

(54) WAVE-POWER UNIT

(75) Inventors: Erland Strömstedt, Uppsala (SE); Stefan Gustafsson, Uppsala (SE)

(73) Assignee: Seabased AB, Uppsala (SE)

( * ) Notice: Subject to any disclaimer, the term of this patent is extended or adjusted under 35 U.S.C. 154(b) by 801 days.

(21) Appl. No.: 13/061,254

(22) PCT Filed: Aug. 26, 2008

(86) PCT No.: PCT/SE2008/050963
§ 371 (c)(1),
(2), (4) Date: Feb. 28, 2011

(87) PCT Pub. No.: WO2010/024740
PCT Pub. Date: Mar. 4, 2010

(65) Prior Publication Data
US 2011/0198850 A1    Aug. 18, 2011

(51) Int. Cl.
*F03B 13/10*    (2006.01)
*F03B 13/12*    (2006.01)
*H02P 9/04*    (2006.01)

(52) U.S. Cl.
USPC .............................................. 290/42; 290/53

(58) Field of Classification Search
CPC ........ F03B 13/12; F03B 13/14; F03B 13/141; F03B 13/16; F03B 13/18; F03B 13/1815; F03B 13/187; F03B 13/262; Y02E 10/32; Y02E 10/38
USPC ............. 290/42, 53; 415/498, 497, 501, 496, 415/495; 417/333
See application file for complete search history.

(56) References Cited

U.S. PATENT DOCUMENTS

| 3,696,251 | A | | 10/1972 | Last et al. |
| 4,076,463 | A | * | 2/1978 | Welczer ........................ 417/331 |
| 4,232,230 | A | | 11/1980 | Ames |
| 4,249,084 | A | * | 2/1981 | Villanueva et al. ............. 290/53 |
| 4,539,485 | A | | 9/1985 | Neuenschwander |
| 6,020,653 | A | * | 2/2000 | Woodbridge et al. ........... 290/53 |
| 7,164,212 | B2 | * | 1/2007 | Leijon et al. .................... 290/42 |
| 7,355,293 | B2 | * | 4/2008 | Bernhoff et al. ................ 290/42 |
| 8,471,398 | B2 | * | 6/2013 | Leijon et al. .................... 290/53 |
| 2006/0090463 | A1 | * | 5/2006 | Burns et al. ..................... 60/495 |
| 2006/0273594 | A1 | * | 12/2006 | Gehring .......................... 290/42 |
| 2010/0219065 | A1 | | 9/2010 | Burns |

FOREIGN PATENT DOCUMENTS

| WO | 03058055 | 7/2003 |
| WO | 2004003380 | 1/2004 |

\* cited by examiner

*Primary Examiner* — Julio C. Gonzalez
(74) *Attorney, Agent, or Firm* — Dykema Gossett PLLC

(57) ABSTRACT

The invention relates to a wave-power unit for the production of electric power. It comprises a floating body (1) arranged for floating on the sea and an electric linear generator (2) having a stator (5) and a translator (8) reciprocating along a center axis. The stator (5) is arranged to be anchored in the bed of the sea and the translator (8) is connected to the floating body (1) by connection means (3, 7). According to the invention the generator (2) is enclosed in a water-tight encapsulation (4) having an upper end wall with an opening through which the connection means (7) extends. The opening has a seal (12) that seals against the connection means (7). The seal (12) is flexibly mounted. The invention also relates to the use of the wave-power unit and to a method for producing electric power.

16 Claims, 2 Drawing Sheets

WAVE-POWER UNIT

FIELD OF INVENTION

The present invention in a first aspect relates to a wave-power unit for the production of electric power comprising a floating body arranged for floating on the sea and an electric linear generator having a stator and a translator reciprocating along a center axis, the stator being arranged to be anchored in the bed of a sea and the translator being connected to the floating body by connection means.

In a second aspect the invention relates to a use of such wave-power unit.

In a third aspect the invention relates to a method of producing electric power by providing a floating body to float on the sea, providing an electric linear generator having a stator and a reciprocating translator, anchoring the stator in the bed of the sea and connecting the translator to the floating body by connection means.

In the present application the terms "radial", and "axial" refer to the axis defined by the reciprocating movement of center of the translator. The terms "upper" and "lower" refer to the vertical direction and relates to the locations of the components in question when the wave-power unit is in operation.

BACKGROUND OF THE INVENTION

Wave movements in the sea and in large inland lakes constitutes a potential source of energy that has scarcely been exploited so far. However various suggestions have been made to use the vertical movements of the sea for producing electrical power in a generator. Since a point on the sea surface makes a reciprocating vertical movement it is suitable to use a linear generator to produce the electric power.

WO 03/058055 discloses such a wave-power unit where the moving part of the generator, i.e. the part that corresponds to the rotor in a rotating generator and in the present application called translator, reciprocates in relation to the stator of the generator. In that disclosure the stator is anchored in the sea bed. The translator is by a wire, cable or a chain connected to a body floating on the sea.

The object of the present invention is to improve the efficiency and the reliability of wave-power unit of the kind in question.

SUMMARY OF THE INVENTION

The object of the invention is in the first aspect of the invention achieved in that a wave-power unit of the kind initially specified further has the specific features that there is a water-tight encapsulation enclosing the generator and having an upper end wall with an opening through which the connection means extends, the opening being provided with a seal that seals against the connection means, the seal being flexibly mounted.

By the encapsulation the generator will be protected against corrosion by the water which often is salt water, and by avoiding water in the path of the translator the braking effect of the water on the translator is eliminated. The seal is necessary for maintaining the inner of the encapsulation free from water. The seal might be affected by high forces from the guiding means due to lateral and angular movements thereof. These forces would increase the wear. However by mounting the seal flexible the friction forces are reduced while maintaining a good sealing effect. These features therefore increase the over all performance of the wave-power unit.

According to a preferred embodiment at least a part of the connection means is a rod element, said part extending through said opening.

In principle the complete connection means could be a long rod. For various reasons it is however advantageous that the major part of the connection means i.e. from the floating body down to a short distance above the generator is flexible and can be a wire or the like. For the part attached to the translator and a short distance upwardly it is preferred that the connection means is in the form of a rod. This simplifies to attain a good sealing effect when it passes through the opening in the upper end wall of the encapsulation. The rod also contributes to maintain the translator in stable purely axial movements, which is important for the efficiency in the electro-mechanical energy conversion.

According to a further preferred embodiment the flexible mounting of the seal is such that it allows lateral and angular movements of the seal.

Thereby the seal is capable to adapt to all the forces that can occur from the connection means on the seal, due to lateral, tilting or twisting movements of the guiding means. Thereby a good sealing effect can be maintained if any of these conditions would occur or a combination of these. It is however desirable to avoid these conditions as far as possible when considering a proper movement of the translator, but should they occur it is important that the sealing effect is maintained.

According to a further preferred embodiment the seal is supported by a supporting element that is mounted on said upper end wall via a flexible member, the flexible member being water-tight connected to said supporting element and to said upper end wall.

This arrangement represents a simple and reliable way of obtaining the resilient mounting of the seal.

According to a further preferred embodiment the flexible member is made of flexible material such as rubber.

Attaining the flexibility by using a material that itself has high resiliency allows a cheap solution combined with high security, and the flexible member can in an easy way be designed such that the appropriate degree of flexibility in different directions is obtained.

According to a further preferred embodiment the flexible member is coaxial with the rod and has at least one portion that is of convex shape in the longitudinal direction in unloaded state when seen from the outside.

The symmetrical arrangement leads to uniform radial flexibility along the circumferential extension of the flexible member. The convex part provides a predictable flexing behaviour of the flexible member.

According to a further preferred embodiment the flexible member has a mounting flange at each end, one flange being clamped by bolts between the supporting element and a clamp ring, and the other flange being clamped between said upper end wall and a clamp ring.

Due to the often high external water pressure and due to the mobility of the flexible member the demands on the mechanical connection of the flexible member is very high in order to secure that it is water-tight, safe and durable. These clamped connections meet these demands.

According to a further preferred embodiment each flange has a radially outer portion that has a larger axial thickness than a radially inner portion of the flange.

Thereby the attachment of the flanges is not only obtained by the pressure of the clamp ring but also locked by shape when the abutting surface of the clamp ring and/or the abutting surface of the supporting element and the upper end wall respectively have a complementary shape. Thereby the connection is still more secure.

According to a further preferred embodiment the axial extension of the seal is larger than its radial extension.

Thereby the sealing action is distributed along a substantial length such that local high sealing pressure can be avoided, which otherwise would disturb the operation and cause high wear. Preferably the axial extension is more than twice the radial extension.

According to a further preferred embodiment the seal includes a plurality of sealing units.

This embodiment also has the advantage that a good sealing can be obtained while keeping the sealing pressure at a moderate level.

According to a further preferred embodiment the encapsulation is filled with a gas at over-pressure.

Thereby the encapsulation will have a higher ability to withstand water leakage. A suitable gas is $N_2$.

In the second aspect of the invention the invented wave-power unit is used for generating electric energy for supply to an electric network.

In the third aspect of the invention the method initially specified further includes the specific measures of enclosing the generator in a water-tight encapsulation, arranging the connection means to extend through an upper end wall of the encapsulation, sealing the connection means that passes through the opening and mounting the seal flexible.

According to preferred embodiments of the invented method it is performed by means of a wave-power unit according to the present invention, in particular according to any of the preferred embodiments thereof.

With the invented use and the invented method, advantages are gained that corresponds to those of the invented wave-power unit and the preferred embodiments thereof and which advantages have been described above.

The invention will be further explained by the following detailed description of an example thereof, and with reference to the accompanying drawings.

DESCRIPTION OF AN EXAMPLE

Figure 1:
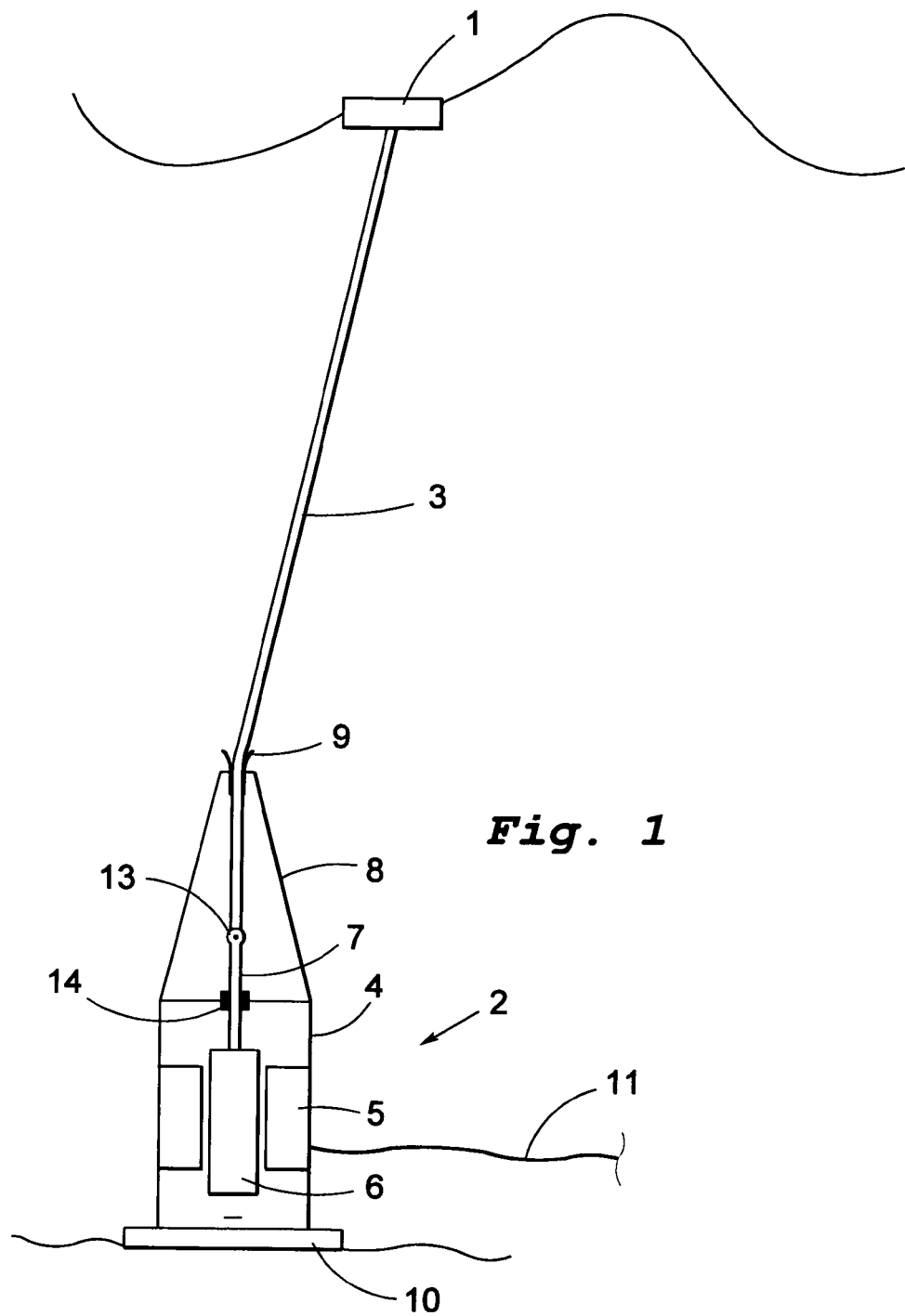
FIG. 1 is a schematical section through a wave-power unit according to the invention.

FIG. 1 is a schematically side view of a wave-power unit according to the invention in operation in the sea. A floating body 1 floats on the sea surface and is connected by a connection means 3, 7, to a linear generator 2 anchored at the sea bed. The connection means consists of an upper part 3, which is a wire, rope, chain or the like and a lower part 7 which is a rigid rod. The wire 3 is connected to the rod 7 by a joint 13. In the figure the generator is attached at the sea bed. It is, however, to be understood that the generator can be located above the sea bed and be anchored in some other way.

The linear generator 2 has a stator 5 with windings and a translator 6 with magnets. The translator 6 is able to reciprocate up and down within the stator 5 thereby generating current in the stator windings, which current by an electric cable 11 is transferred to an electric network.

When the floating body 1 due to the wave movements of the sea surface is forced to move up, the floating body will pull the translator 6 down upwards. When the floating body thereafter moves down the translator 6 will move down through gravity.

Optionally but preferably a spring (not shown) or the like acting on the translator 6 provides an additional force downwards.

Since the generator 2 is anchored in the sea bed and the floating body 1 floats freely on the water surface, the floating body is free to move laterally in relation to the generator 2. Thereby the wire 3 will become inclined.

The generator 2 is enclosed in a water-tight encapsulation 4, which is filled with $N_2$ of over-pressure. Rigidly attached to the top of the encapsulation 4 there is a conical frame 8 having a guiding device 9.

The guiding device 9 guides the connection means to move vertically below the guiding device 9 while allowing the connection means 3 that is above the guiding device to move in an inclined position.

The guiding device 9 allows the connection means 3 to gradually change its direction when passing through guiding device 9, such that the wear of the connection means becomes limited.

The rod 7 extends through an opening of an upper end wall 14 of the encapsulation 4 and at the entrance there is provided a watertight seal 12.

Figure 2:
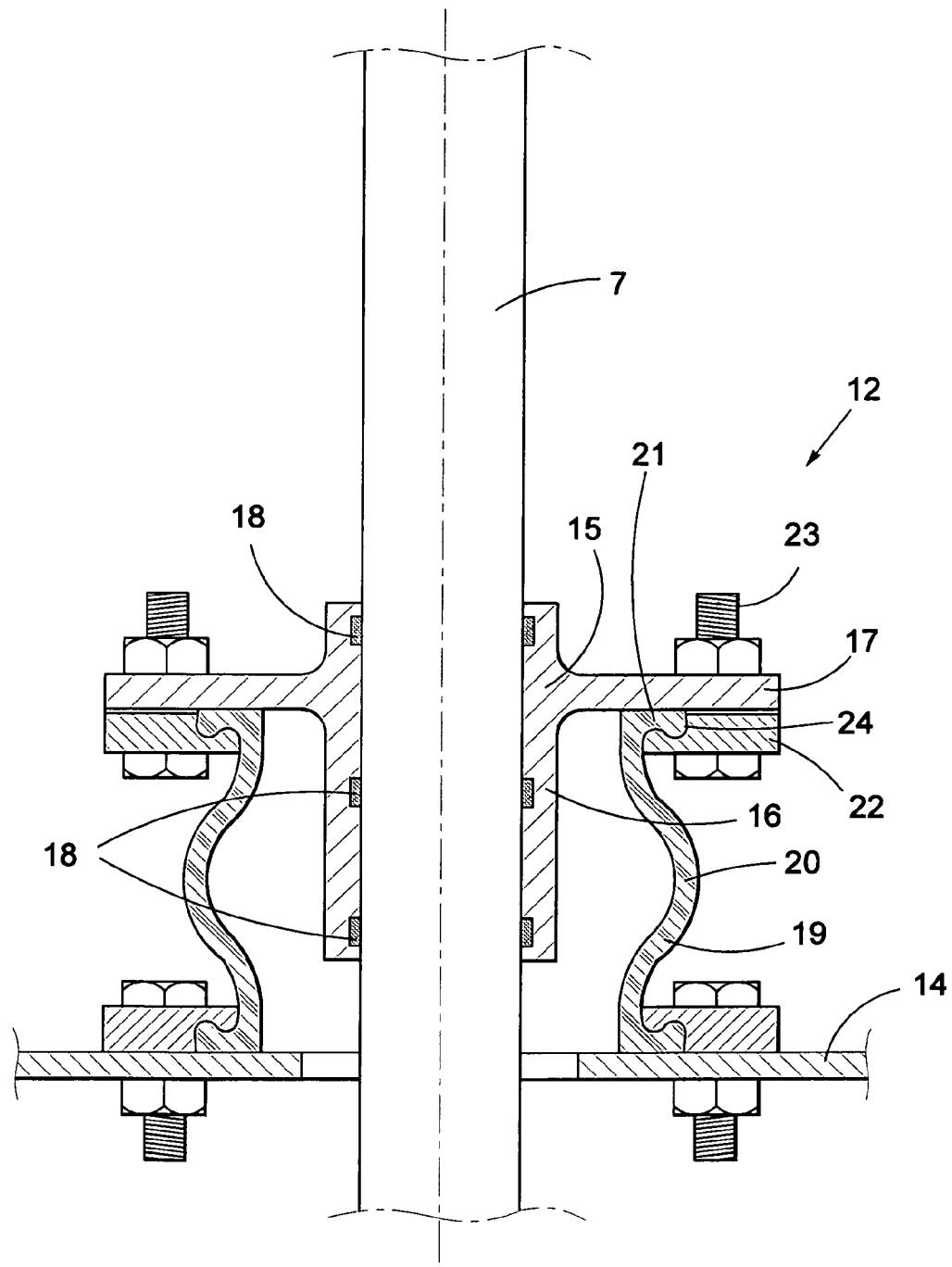
FIG. 2 is a section through a detail of FIG. 1.

FIG. 2 is an enlarged section through the seal 12 in FIG. 1. The seal consists of a supporting element 15 having a cylindrical portion 16 around the reciprocating rod 7 and a flange portion 17. The cylindrical portion 16 houses a number of sealing units 18 that are pressed against the rod 7 such that the inner of the encapsulation (below the seal) is effectively sealed against the water on the external side (above the seal). The supporting element 15 is connected to the upper end wall 14 of the encapsulation via a flexible member 19 made of rubber or the like. The flexible member 19 is generally tubular and has a middle portion 20 of slightly increased diameter forming a convex shape of the flexible member.

The upper end of the flexible member 19 has an outwardly directed radial flange 21 for mounting the flexible member 19 to the flange portion 17 of the supporting element 15. The flange 21 is clamped between the flange portion 17 and a clamp ring 22 by means of a number of bolts 23.

The radially outer part of the flange 21 has an axially directed projection 24 and the radially inner part of the co-operating clamp ring 22 has a shape that is complementary to the flange 21 so that the flange 21 is effectively locked. The lower end of the flexible member 19 has a corresponding flange which is attached to the end wall 14 of the encapsulation in a similar way as described above.

The invention claimed is:

1. A wave-power unit for the production of electric power and comprising a floating body arranged for floating on the sea and an electric linear generator having a stator and a translator reciprocating along a center axis, the stator being arranged to be anchored in the bed of a sea and the translator being connected to the floating body by connection means wherein the wave-power unit includes a water-tight encapsulation enclosing the generator and having an upper end wall with an opening through which the connection means extends, the opening being provided with a seal that seals against the connection means, the seal being flexibly mounted in order to allow axial movement of the seal with respect to the upper end wall.

2. The wave-power unit according to claim 1, wherein at least a part of the connection means is a rod element, said part extending through said opening.

3. The wave-power unit according to claim 1, wherein the flexible mounting of the seal is constructed to allow lateral and angular movements of the seal.

4. The wave-power unit according to claim 3, wherein the seal is supported by a supporting element that is mounted on said upper end wall via a flexible member, the flexible member being water-tight connected to said supporting element and to said upper end wall.

5. The wave-power unit according to claim 4, wherein said flexible member is made of resilient material.

6. The wave-power unit according to claim 5, wherein said resilient material consists of rubber.

7. The wave-power unit according to claim 4, wherein the flexible member is coaxial with the rod and has at least one portion that is of convex shape in the longitudinal direction in unloaded state when seen from the outside.

8. The wave-power unit according to claim 7, wherein the flexible member has a mounting flange at each end, one flange being clamped by bolts between a flange portion of said supporting element and a clamp ring, and the other flange being clamped by bolts between said upper end wall and a clamp ring.

9. The wave-power unit according to claim 8, wherein each flange has a radially outer portion that has a larger axial thickness than a radially inner portion of the flange.

10. The wave-power unit according to claim 1, wherein the axial extension of the seal is larger than a radial extension thereof.

11. The wave-power unit according to claim 10, wherein the axial extension of the seal is at least twice as large as the radial extension thereof.

12. The wave-power unit according to claim 1, wherein the seal includes a plurality of sealing units.

13. The wave-power unit according to claim 1, wherein the encapsulation is filled with a gas at over pressure.

14. The wave-power unit according to claim 13, wherein said gas consists of nitrogen.

15. The use of a wave power unit according to claim 1, for generating electric energy for supply to an electric network.

16. A method of producing electric power by providing a floating body to float on the sea, providing an electric linear generator having a stator and a translator reciprocating along a center axis, anchoring the stator in the bed of the sea and connecting the translator to the floating body by connection, means, enclosing the generator, in a water-tight encapsulation, arranging the connection means to extend through an opening in an upper end wall of the encapsulation, sealing the connections means that passes through the opening and mounting the sealing flexible in order to allow axial movement of the seal with respect to the upper end of the wall.

* * * * *